Oct. 9, 1962  V. E. GEX ET AL  3,057,127
SEALING SOLUBLE FILM PACKETS
Filed Oct. 10, 1960

INVENTORS
VIRGIL E. GEX.
BY ROBERT L. KRAMER,
Allen & Allen
ATTORNEYS.

United States Patent Office 3,057,127
Patented Oct. 9, 1962

3,057,127
SEALING SOLUBLE FILM PACKETS
Virgil E. Gex, Wyoming, and Robert L. Kramer, Finneytown, Ohio, assignors to The Procter & Gamble Company, Cincinnati, Ohio, a corporation of Ohio
Filed Oct. 10, 1960, Ser. No. 61,509
9 Claims. (Cl. 53—28)

The invention relates to the packaging of materials in packets formed from water-soluble films. There are various water-soluble films available at the present time, including films of polyvinyl alcohol, derivatives of polyvinyl alcohol, and water-soluble cellulosic derivatives. The specific composition of the film does not form a limitation on this invention so long as the film is of the water-soluble type. There are also various methods and mechanisms whereby packets of useful material may be formed from such films. Usually a pair of film strips is employed, which strips are sealed together along spaced longitudinal lines which are continuous, and at invervals along spaced transverse lines after introduction of the material to be packaged so that it will lie in the packets so formed. The combined structure is then cut apart along lines intermediate the edges of the sealed areas, whereby to produce individual packets sealed on all four edges.

These is a widespread use for packets of water-soluble materials in water-soluble films, where the great advantage is that the entire packet may be introduced into a quantity of water to form a solution. For example, packets of spray dried detergent materials are being produced in various sizes so that the housewife may simply drop one or more packets into water in a washing machine or in a dishpan, and thereby achieve a washing solution of predetermined strength, without the necessity of measuring granular material from a bulk source. Numerous other materials intended for water solution may be packaged in the same way; and the nature of the water-soluble materials so packaged also does not form a limitation upon this invention.

In order to make an exemplary showing, the invention will be described in connection with that type of packeting procedure in which a film strip is led onto the surface of a moving member having spaced recesses providing a series of pockets. The film strip is caused to adhere to the lands of the member between the pockets, and is heated so as to be brought into a distortable condition. The pockets have connections with a vacuum source so that the film strip is drawn down into the pockets in a stretching operation in which the area of portions of the film is increased. The moving member carries the preformed film pockets to another station at which a predetermined quantity of the material to be packaged is introduced into each packet by suitable means. Then a second, undistorted film of water-soluble substance is brought into contact with the first mentioned film on the lands of the moving member. The two film strips are sealed together on the lands, and the packeting operation is complete excepting for the severance of the individual packets from each other and their discharge from the moving member.

Hitherto considerable difficulty has been encountered in sealing the two film strips to each other. Heat is ordinarily applied for the purpose, and it is applied through the overlying film as by a roller which applies the overlying film to the lands of the moving member. The films, being thermoplastic, frequently have a very narrow range of temperature in which they are softened sufficiently to fuse or stick together without being seriously weakened at the same time. It has been suggested that since the films are water-soluble they can be sealed together by softening the surface of one or more films with water thereby rendering it tacky. But it is again difficult to develop the required tack without seriously weakening one or both of the films. As in the case of the application of heat, there may be enough residual stress in a deformed film to cause it to pull apart, thereby destroying the package. Furthermore, it is difficult to apply exactly the right amount of water in exactly the right areas, and the application of water to the contents of the packets during the operation is generally undesirable.

The primary object of the invention is to provide a sealing process and mechanism which will be positive in its action and devoid of the above noted difficulties.

It is also an object of the invention to provide a sealing process and mechanism which will be inexpensive in first cost and in operation.

These and other objects of the invention which will be set forth hereinafter or will be apparent to one skilled in the art upon reading these specifications, are accomplished by that procedure and in the use of that mechanism of which certain exemplary embodiments will now be described. Reference is made to the accompanying drawings wherein.

Briefly, in the practice of the invention, it has been found that the film strips may be adequately and positively sealed together by the use of steam under the particular conditions hereinafter set forth. The use of ordinary or "wet" steam at atmospheric or substantially atmospheric pressure will not serve the purpose. Such steam is characterized by droplets of moisture which oversoften the films and tend to weaken them in certain areas so that residual stresses in deformed portions of the film are likely to produce disruption. High pressure steam cannot be used directly since it would tend to displace a filling of the material to be packaged from the pockets in the distorted film strip. It is necessary to use steam at high temperature but at low pressure, and one aspect of this invention has to do with the simultaneous achievement of these two generally contradictory conditions.

The use of steam in the way hereinafter taught has been found very effective and positive in its sealing action. The seal is produced by a combination of heat and solvent action. The use of dry gases such as air or any of the inert gases like nitrogen is not effective even when such gases are used at the same temperatures as hereinafter set forth for the superheated steam. There is a certain small amount of condensation of the steam on the surfaces of the film which produces a necessary additional softening; but this condensation does not involve the formation of droplets of substantial size or the wetting of areas of the film strips. It is possible within the purview of this invention, however, to dilute the steam with hot dry gases such as air, nitrogen and the like although this is not ordinarily necessary. The sealing method and means herein described is relatively insensitive to film speed, film moisture content, and ambient air conditions. The seals formed remain highly water-soluble.

Figure 2:
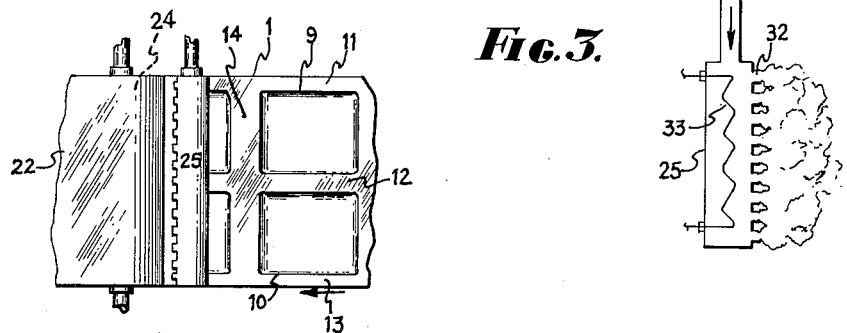
FIG. 2 is a partial plan view of the apparatus at the point of application of the second film.

Referring to the drawings, a moving member in the form of a drum 1 is journalled in bearings 2 on the frame 3 of the machine. The drum can be driven by a motor 4 through a gear reduction box 5 or its equivalent by means of a belt 6 and gears 7 and 8. The surface of the drum is provided with pockets indicated in FIG. 2 at 9 and 10. The figure shows a portion of a drum having two circumferential rows of pockets; but it will be understood that the drum may be provided with fewer or more of such rows of pockets as may be desired to provide the required capacity. The pockets are separated by circumferential lands 11, 12 and 13 and by transverse lands one of which is shown at 14. The lands of the moving member 1 may, if desired, be covered with a rubbery material to increase the adhesion of the film.

Figure 1:
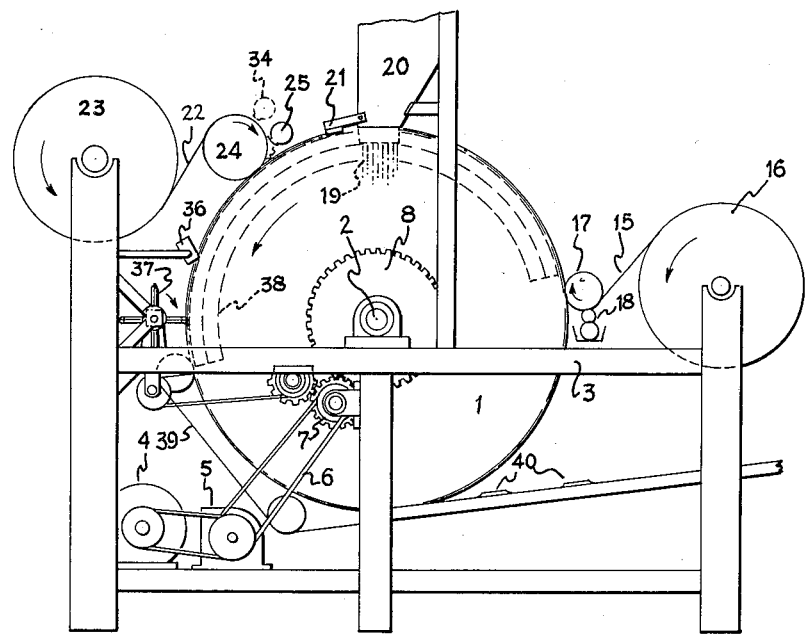
FIG. 1 is a semi-diagrammatic side elevation of a packet forming mechanism embodying the principles of this invention.

In FIG. 1 a first film strip 15 is withdrawn from a roll 16 journalled on the frame of the machine and is applied to the surface of the moving member 1 by a roller 17. The under surface of the film 15 may be moistened as at 18 as it is led onto the surface of the moving member 1; and the roller 17 will be heated so as to soften the film and to cause it to adhere to the lands. The adhesion obtained in this way is usually sufficient, although if desired mechanical belt elements (not shown) may be caused to travel with the outer lands at least of the moving member 1 so as to hold the edges of the film against being drawn inwardly during the formation of the pockets. As illustrated diagrammatically at 19 in FIG. 1 there are vacuum connections to the various pockets so that when the film 15 is caused to adhere to the moving member 1 it will be drawn downwardly into the pockets so as to form recesses for the reception of the material to be packaged. The manner in which the first water soluble film is adhered to the drum, and the mechanisms and procedure for distorting it to form the pockets, being old in the art, do not form a limitation on this invention.

The moving device 1 rotates in the direction of the arrow in FIG. 1; and at a suitable point the pockets in the distorted film strip are filled with their contents. This may be done in any suitable way; and the nature of the contents and of the filling operation is not a limitation on the invention. A preferred filling device is disclosed in the copending application of Virgil E. Gex and Abraham Bart entitled Controlled Volumetric Filling of Granular Product Into Continuously Moving Pockets, Serial No. 62,606, filed October 14, 1960, and assigned to the same assignee. In FIG. 1 a hopper has been indicated at 20 and a scraper at 21.

During the further travel of the now filled pockets a second strip 22 of water-soluble film is withdrawn from a supply roll 23 and is applied to the outer surface of the moving member 1 by a roll 24 so that the second film strip will overlie the fillings of the material to be packaged in the various pockets and will contact the first film strip on the lands. The sealing preferably is accomplished by directing superheated steam from a manifold 25 into the bite between the roll 24 and the moving member 1.

In the sealing of thermoplastic water-soluble films there is a relationship between heat and moisture content. For example, a polyvinyl alcohol film containing 13% moisture may be heat sealed at a temperature of about 240° F., while if the film contains 10% moisture a sealing temperature of about 290° F. is required. The sealing temperature varies inversely with the film moisture content. While pieces of film may be sealed to each other at room temperatures by the solvent action of water, the disadvantages of this have been set forth above. At the other end of the scale, sealing has been found impracticable through the use of hot dry gases other than steam at temperatures up to 800° F. Apparently the hot dry gases abstract moisture from the film and prevent the formation of an adequate seal.

The use of steam as taught herein not only results in the application of heat but also in the control of the moisture content of the surfaces of the film strips, making the sealing operation independent of such factors as the moisture content of the film strips prior to the sealing operation, the ambient air conditions and the sealing speed. Steam is self-regulating in character since heat and moisture tend to vary in the same inverse way as the sealing requirements of the film itself. Thus the range of sealing conditions in the practice of this invention is quite broad; and the figures hereinafter given are intended to be exemplary rather than limiting.

Figure 3:
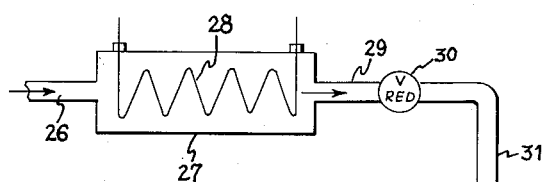
FIG. 3 is a diagrammatic representation of means for treating and applying stream in the sealing of the films.

A suitable form of apparatus for the application of the steam is indicated in FIG. 3. Steam from any suitable source is fed by means of a conduit 26 to a manifold 27. The steam may be low pressure steam having, say, a temperature of 225° F. at 10 p.s.i.g. The manifold 27 is provided with an electrical or other heater 28 which will raise the temperature of the steam to, say, about 600° F. The superheated steam leaves the manifold through a conduit 29 containing a pressure reducing valve 30. The valve operates to lower the pressure of the steam to a value close to that of atmospheric pressure. The steam travels from the reducing valve to the manifold 25 through a conduit 31. The manifold 25 is of a length to cross the surface of the moving member 1, and is provided with a series of nozzles 32 through which the steam issues at low pressure in a form which can best be described as a cloud as distinct from pressure jets. The manifold 25 is provided with an electrical or other heater 33 which maintains the steam in a superheated condition and insures that it will issue at a high temperature. The temperature of the steam as it issues from the manifold 25 may vary from about 220° to about 1000° F. and preferably is in the range of 400°–600° F.

It would be possible to connect a source of superheated high pressure steam directly to the pressure reducing valve 30 if desired. But the arrangement shown permits the use of a relatively low pressure source and obviates the necessity of traps to remove water from the steam. It is necessary that the steam issuing from the nozzles be dry, i.e. devoid of water droplets of appreciable size.

As has been indicated, when the steam is used as described it not only heats the film strips but controls their moisture content at the surfaces. This action is automatic, and dependable seals are formed instantaneously as the roller 24 presses the two films together on the lands of the moving member 1. The film 22 is not softened to the extent that there is any tendency for it to adhere to the roller 24. Neither will the film 15 be softened locally or generally to the extent that any residual stresses due to the formation of the film will tend to disrupt it. The roller 24 is not normally heated internally, but is allowed to assume an equilibrium temperature in the sealing operation.

Figure 4:
FIG. 4 is an elevational view of another type of steam applying manifold.

If additional tempering of the film 22 is desired a second manifold 34 may be used to bathe its surfaces with steam as it passes around the periphery of the roller 24. If it is desired to dilute the steam with hot dry gases, such gases may be introduced into the system at any suitable point, but preferably into the manifold 27. As shown in FIG. 4, the manifold 25 may be provided with a continuous slot-shaped orifice 35 in lieu of the nozzles 32.

The application of superheated steam or of a mixture of superheated steam and hot dry gases in the way set forth herein does not affect the contents of the pockets in the distorted film strip. The pressure with which the gases exit from the manifold 25 is insufficient to cause physical displacement of granular contents. While presumably there will be a slight condensation of moisture on the surfaces of the materials filled into the pockets, the amount of such moisture is insufficient to alter the physical characteristics of the material. The presence of a certain degree of humidity within the final packets is of advantage in preventing embrittlement of the film and consequent disruption upon handling.

The packets will now be complete excepting for the severing of the packets from each other. Longitudinal severing is easily accomplished by means of blades 36. Transverse severing may be accomplished in various ways by means of various cutting devices. A preferred mode of severance in the transverse direction is that described and claimed in the copending application of Virgil E. Gex and Abraham Bart entitled Hot-Wire Cut-Off, Serial No. 59,228, filed September 29, 1960, and assigned to the same assignee. This wire cutter device is diagrammatically indicated at 37 in FIG. 1.

The individual packets are then discharged from the moving member 1. At the end of the vacuum manifold 38 within the moving member 1 a belt 39 passing over suitable rollers holds the packets within the recesses of the member 1 to a point where the belt leaves the member and carries the packets 40 away to a point of delivery for packaging.

Modifications may be made in the invention without departing from the spirit of it. The invention having been described in certain exemplary embodiments, what is claimed as new and desired to be secured by Letters Patent is:

1. A process of sealing packets in which a material to be packaged is enclosed between layers of thermoplastic, water soluble, moisture containing films, which process comprises associating spaced charges of the material to be packaged with a portion of the film, and then enclosing the said charges by covering them with another portion of the film by leading such other portion of film against the first mentioned portion, and sealing meeting edge parts of the film portions together, in which process a blanket of gas containing superheated steam is maintained in contact at least with one of said film portions closely adjacent the point at which said second portion is led against the first portion, so as to soften with heat and control the moisture content of at least one of said film portions, the film portions then being firmly pressed together where they meet in areas off the edges of said spaced charges.

2. The process claimed in claim 1 wherein said gas consists essentially of steam at atmospheric pressure and at a temperature of about 220° to 1000° F.

3. The process claimed in claim 2 wherein steam from a low pressure source is first sent through a chamber in which its temperature is elevated by heating means to about 600° F., then through a pressure reducing valve by which its pressure is reduced substantially to atmospheric pressure, then into a manifold in which its temperature is again raised by heating means to a temperature of about 220° to 1000° F., from which manifold the steam issues in the form of said blanket.

4. A process of sealing packets in which a material to be packaged is enclosed between layers of thermoplastic, water soluble, moisture containing films, which process comprises leading a first strip of such film in softened condition onto a moving member having recesses and lands surrounding said recesses, causing the material of such film to be distorted into said recesses to form pockets, introducing the material to be packaged into said pockets, covering the first film strip with a second thermoplastic soluble film strip by leading said second strip thereagainst so that said film strips come together on said lands, sealing said strips together and controlling their moisture content by introducing therebetween substantially at the point where the first strip is led against the second strip a blanket of superheated steam at substantially atmospheric pressure, and pressing said strips together on said lands.

5. The process claimed in claim 4 wherein said steam has a temperature of about 220° to 1000° F.

6. The process claimed in claim 5 wherein said steam is diluted with hot, dry gas.

7. The process claimed in claim 5 wherein steam from a low pressure source is first sent through a chamber in which its temperature is elevated by heating means to about 600° F., then through a pressure reducing valve by which its pressure is reduced substantially to atmospheric pressure, then into a manifold in which its temperature is again raised by heating means to a temperature of about 220° to 1000° F., from which manifold the steam issues in the form of said blanket.

8. A process of sealing thermoplastic, water-soluble, moisture containing films to each other which comprises leading said films against each other around oppositely moving members which come together to form a nip, and directing into said nip a gas consisting essentially of superheated steam at substantially atmospheric pressure, the steam serving to control the moisture content of the surfaces of the said films, and the temperature of the gas being sufficiently high in relation to the moisture content of the films to render the film surfaces tacky, the films being pressed together in said nip while the film surfaces are tacky.

9. In apparatus for forming packets of material encased in thermoplastic water-soluble, moisture containing films, a first moving member presenting recesses into which a first film strip may be distorted to form pockets, said member having lands surrounding said recesses, a second moving member for leading a second film strip against said first film strip on the lands of said first moving member, said moving members coming together to form a nip, and a manifold adjacent said nip for introducing between said film strips a blanket of superheated steam at substantially atmospheric pressure.

References Cited in the file of this patent
UNITED STATES PATENTS

| | | |
|---|---|---|
| 2,674,073 | Taylor et al. | Apr. 6, 1954 |
| 2,773,286 | Piccard et al. | Dec. 11, 1956 |
| 2,946,095 | Beer | July 26, 1960 |